US011663320B2

(12) United States Patent
DePree et al.

(10) Patent No.: US 11,663,320 B2
(45) Date of Patent: May 30, 2023

(54) SYSTEM AND METHODS FOR AUTOMATED SOFTWARE ANALYSIS AND CLASSIFICATION

(71) Applicant: BANK OF AMERICA CORPORATION, Charlotte, NC (US)

(72) Inventors: Eric Joseph DePree, Chicago, IL (US); Michael Edward Hunter Dunten, Greenwood, IN (US); Robert Riley Zink, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

(21) Appl. No.: 17/146,863

(22) Filed: Jan. 12, 2021

(65) Prior Publication Data
US 2022/0222334 A1  Jul. 14, 2022

(51) Int. Cl.
*G06F 21/51* (2013.01)
*G06N 3/04* (2023.01)
*G06N 3/049* (2023.01)
*G06F 21/57* (2013.01)
*G06F 21/56* (2013.01)
*G06F 21/12* (2013.01)

(52) U.S. Cl.
CPC ............ *G06F 21/51* (2013.01); *G06F 21/126* (2013.01); *G06F 21/563* (2013.01); *G06F 21/577* (2013.01); *G06N 3/049* (2013.01)

(58) Field of Classification Search
CPC ...... G06F 21/51; G06F 21/126; G06F 21/563; G06F 21/577
See application file for complete search history.

(56) References Cited

U.S. PATENT DOCUMENTS

| | | |
|---|---|---|
| 6,968,384 B1 | 11/2005 | Redding et al. |
| 8,301,759 B2 | 10/2012 | Pietrek et al. |
| 8,321,352 B1 | 11/2012 | Rameshkumar et al. |
| 8,538,889 B2 | 9/2013 | Bhave et al. |
| 9,280,908 B2 | 3/2016 | Isensee et al. |
| 9,384,450 B1 | 7/2016 | Cordes et al. |
| 9,424,403 B2 | 8/2016 | Gocek et al. |
| 9,703,840 B2 | 7/2017 | Allen et al. |
| 9,971,880 B2 | 5/2018 | Ferris et al. |
| 10,402,544 B2 | 9/2019 | Ferris et al. |
| 10,504,521 B1 | 12/2019 | Taubman et al. |
| 10,805,144 B1 | 10/2020 | Gangadharan et al. |
| 11,074,494 B2 * | 7/2021 | Zhao ..................... G06N 3/044 |
| 2008/0189326 A1 | 8/2008 | Norrie |
| 2008/0208754 A1 | 8/2008 | Zunke et al. |

(Continued)

*Primary Examiner* — Phy Anh T Vu
(74) *Attorney, Agent, or Firm* — Moore & Van Allen PLLC; Nicholas C. Russell

(57) ABSTRACT

Embodiments of the invention are directed to systems, methods, and computer program products for creating an effective baseline for controlling software and programs running on a user device or virtual machine environment of an enterprise network. Historical data may be used to train one or more iterative machine learning processes for intelligently identifying relevant program characteristics and aiding or automating a determination as to a software or program's need, usage, redundancy, or security. Determinations regarding software or program classifications may be used for further review or automated control of software or program execution within a network environment.

17 Claims, 3 Drawing Sheets

(56) References Cited

U.S. PATENT DOCUMENTS

| | | |
|---|---|---|
| 2009/0276269 A1 | 11/2009 | Yee et al. |
| 2010/0070416 A1 | 3/2010 | McKelvey |
| 2010/0106678 A1 | 4/2010 | Pietrek et al. |
| 2012/0255025 A1 | 10/2012 | Roshchin |
| 2016/0127453 A1 | 5/2016 | Dingsor et al. |
| 2017/0185785 A1* | 6/2017 | Vorona .................. G06F 21/552 |
| 2020/0001964 A1 | 1/2020 | Wagner |
| 2020/0145455 A1* | 5/2020 | Nandi .................... G06F 21/577 |
| 2021/0365762 A1* | 11/2021 | Rafey .................... G06K 9/6256 |
| 2022/0318654 A1* | 10/2022 | Lin ........................ G06F 21/577 |

* cited by examiner

SYSTEM AND METHODS FOR AUTOMATED SOFTWARE ANALYSIS AND CLASSIFICATION

FIELD

The present invention embraces a system for implementing a dynamic application analysis system within a technical enterprise environment.

BACKGROUND

In large networks with numerous users and devices, the task of inventorying existing applications and software is crucial in maintaining security of the network and enterprise environment as a whole. Typically, an entity or enterprise may need to evaluate each service, application, or software program to ensure compliance with the standards and protocols of both entity and industry standards. There is a need to establish a solution for implementing an intelligent and automated analysis and evaluation framework within an enterprise environment that is easily accessible, dynamically updated, highly efficient in terms of resource demand, and has the ability to relay pertinent information to responsible parties for review in a quantifiable and standardized fashion.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address the above and/or other needs by providing a system for creating an effective baseline for controlling software and programs running on a user device or virtual machine environment of an enterprise network. Historical data may be used to train one or more iterative machine learning processes for intelligently identifying relevant program characteristics and aiding or automating a determination as to a software or program's need, usage, redundancy, or security. Determinations regarding software or program classifications may be used for further review or automated control of software or program execution within a network environment. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for automated software analysis and classification, generally comprising the steps of receiving software data of a computer program, wherein the software data comprises user data, usage data, and classification data; selecting software data for the computer program for further analysis and classification; accessing a historical database of pre-approved programs information containing one or more pre-approved program identifiers, wherein the historical database is categorized according to user data, usage data, and classification data; identifying the computer program does not match one or more of the pre-approved program identifiers and label the program as an unknown program; conducting an iterative machine learning analysis of the software data and identify relevant characteristics of the unknown program according to a data training set; and generating a classification for the unknown program.

In some embodiments, the relevant characteristics comprise one or more factors related to a need for the program, wherein the need is based on redundancy of the unknown program's features as compared to one or more pre-approved programs.

In other embodiments, the system is further configured to generate a set of user questions based on the relevant characteristics of the unknown program.

In further embodiments, the set of user questions is automatically transmitted to one or more users via a user application on a user device.

In still further embodiments, the relevant characteristics comprise one or more factors related to security vulnerability of the unknown program.

In some embodiments, wherein the relevant characteristics comprise one or more factors related to security vulnerability of the unknown program.

Furthermore, the iterative machine learning analysis further comprises use of a long short term memory deep learning network model to encode and decode for pattern detection and classification of authorized or unauthorized software types based on extrapolation of patterns from historical data.

In other embodiments, the system may be further configured to determine the unknown program as unauthorized, and automatically trigger a disabling of execution of the unknown program on a user device or virtual machine environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
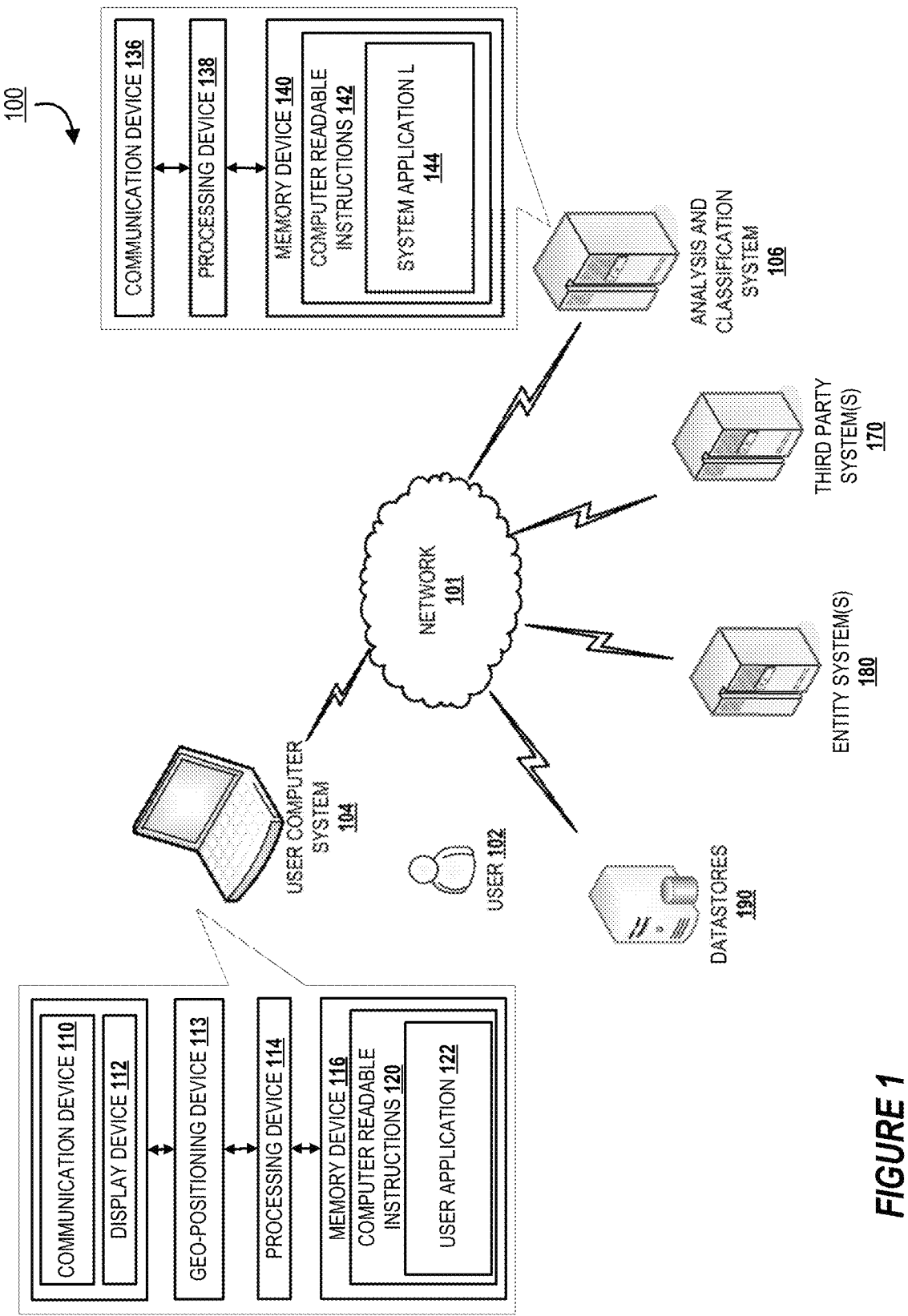
Figure 2:
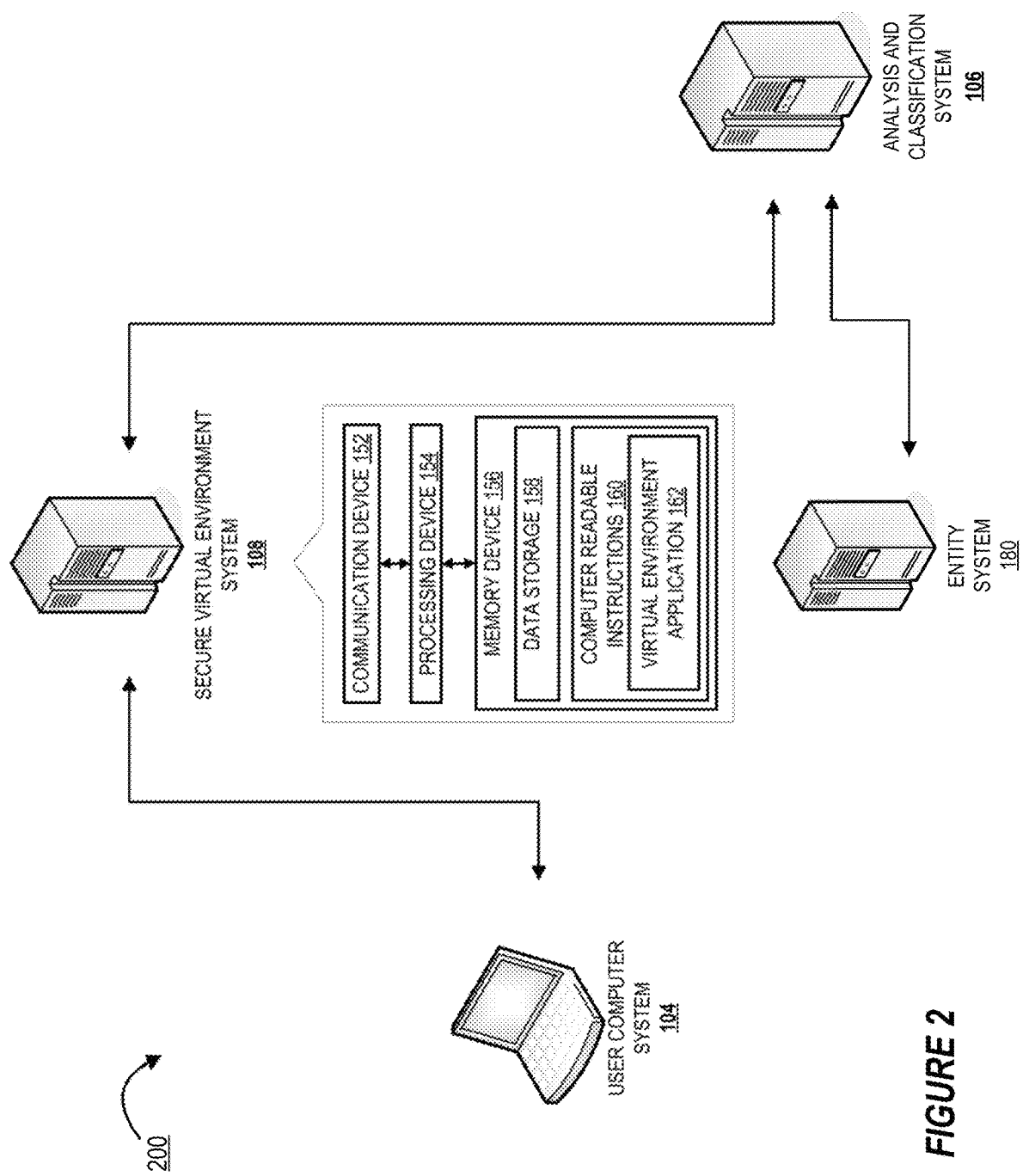
Figure 3:
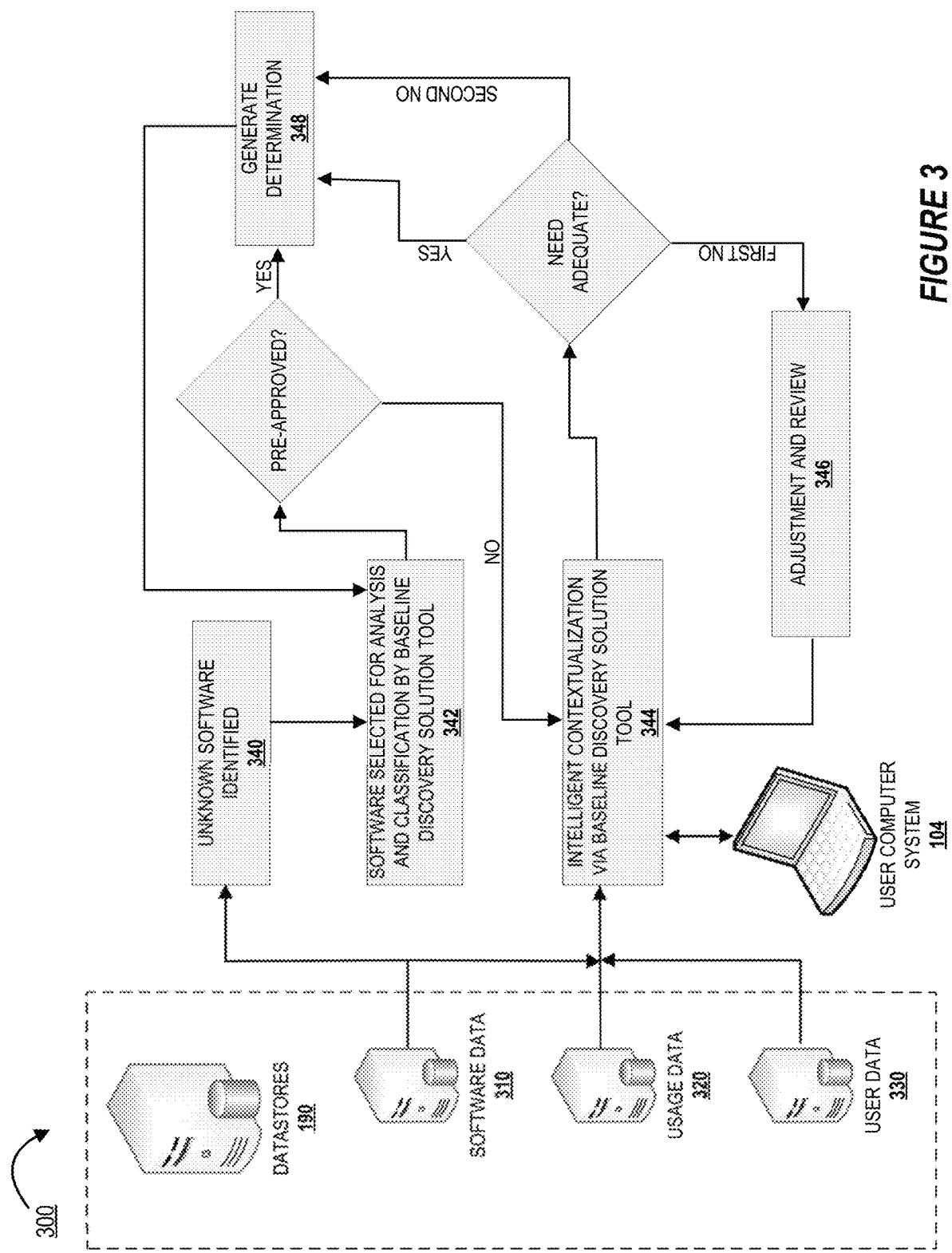

Having thus described embodiments of the invention in general terms, reference will now be made to the accompanying drawings, wherein:

FIG. 1 depicts a platform environment 100 providing a system for automated software analysis and classification, in accordance with one embodiment of the present invention;

FIG. 2 depicts an operating environment 200 for a secure virtual environment system, in accordance with one embodiment of the present invention; and FIG. 3 depicts an operating environment 300 for intelligent analysis of data via a baseline discovery solution tool, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein. In accordance with embodiments of the invention, the term "user" may refer to an authorized person, business or the like, who utilizes an external apparatus such as a user device, for accessing systems and tools described herein. The external apparatus may be a user device (computing devices, mobile devices, smartphones, wearable devices, and the like). In some embodiments, the user may seek to perform one or more user activities using a web-based application accessed via the user device web browser or in some embodiments may perform one or more user activities using a locally stored application on the user device to interact with the system of the invention. In some embodiments, the user may perform a query by initiating a request for information from the entity systems or various databases using the user device to interface with the system to configure, test, or review system data conversions, tools, or ongoing conversion projects.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user datastore that includes only personal information associated with the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/ or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like. In some embodiments, the graphical user interface may be presented in a different configuration depending on the user or type of user that accesses it. In some embodiments, the graphical user interface may be a component of a web-based application that the user may access remotely over a network or a secure virtual private network, secure socket layer, and the like.

Embodiments of the invention are directed to systems, methods, and computer program products for streamlining the processes involved with the conversion of large stores of data between multiple data management system components. The system is further configured to automate the performance of data review. Furthermore, the system is configured to automate the production of conversion code, launch command line interface on a user device, connect to target database components, retrieve necessary information, and automatically detect relational database management software capabilities and requirements. During the system processes, the system is designed to automatically performs pre-validation tasks and generate backup script files in chronological order.

FIG. 1 depicts a platform environment 100 providing a system for automated software analysis and classification, in accordance with one embodiment of the present invention.

As illustrated in FIG. 1, an analysis and classification system 106 (the "system") is configured for providing access to a user 102 via user device, or user computer system 104. The analysis and classification system 106 is operatively coupled, via a network 101 to one or more user computer systems 104, to entity systems 180, datastores 190, and other external systems/third-party servers such as third party system(s) 170. In this way, the analysis and classification system 106 can send information to and receive information from multiple user computer systems 104 to provide an integrated platform and data access to a user 102. At least a portion of the system is typically configured to reside on the user computer system 104 (for example, at the user application 122), on the analysis and classification system 106 (for example, at the system application 144), and/or on other devices and systems such as the entity systems 180 and is a responsive system that facilitates execution of database configurations and version management of the evaluation system backend data. In some embodiments the system tools and functions are utilized by a database administrator in order to perform a data conversion of entity data provided by one or more entity system(s) 180, third party system(s) 170, or other systems not shown herein. In further embodiments, the database administrator may utilize tools and systems of the present invention in order to perform analysis or evaluation services, reporting services, data integration services, or the like.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the user 102 is an individual that wishes to conduct one or more activities with analysis and classification system 106 using the user computer system 104. In some embodiments, the user 102 may access the analysis and classification system 106, and/or the entity system 180 through a user interface comprising a webpage or a user application. Hereinafter, "user application" is used to refer to an application on the user computer system 104 of the user 102, a widget, a webpage accessed through a browser, and the like. As such, in some instances, the user device may have multiple user applications stored/installed on the user computer system 104 and the memory device 116 in particular. In some embodiments, the user application is a user application 122, also referred to as a "user application" 122 herein, provided by and stored on the user computer system 104 by the analysis and classification system 106. In some embodiments the user application 122 may refer to a third party application or a user application stored on a cloud used to access the analysis and classification system 106 through the network 101. In some embodiments, the user application is stored on the memory device 140 of the analysis and classification system 106, and the user interface is presented on a display device of the user computer system 104, while in other embodiments, the user application is stored on the user computer system 104.

The user 102 may subsequently navigate through the interface, perform one or more actions or initiate one or more data gathering steps, responses to inquires for data, inventories, or configurations using a central user interface provided by the user application 122 of the user computer system 104. In some embodiments, the user 102 may be routed to a particular destination using the user computer system 104. In some embodiments the user computer system 104 requests and/or receives additional information from the analysis and classification system 106 or the user computer system 104 for authenticating the user or the user device, determining appropriate queues, gathering information about the user computer system 104 or the software or applications stored or installed thereon, executing information queries, executing scripts, initiating reporting functions, and other system functions.

The user computer system 104, herein referring to one or more user devices, wherein each device may generally comprise a communication device 110, a display device 112, a geo-positioning device 113, a processing device 114, and a memory device 116. Typically, the user computer system 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, datastores 190, and the analysis and classification system 106. As such, the communication device 110 generally comprises a modem, server, or other device for communicating with other devices on the network 101. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user computer system 104 with respect to satellites, transmitter/beacon devices, telecommunication towers and the like. In some embodiments the user computer system 104 may include authentication devices like fingerprint scanners, microphones and the like that are configured to receive bio-metric authentication credentials from the user.

The user computer system 104 comprises computer-readable instructions 120 stored in the memory device 116, which in one embodiment includes the computer-readable instructions 120 of the user application 122. In this way, users 102 may authenticate themselves, system tools and functions, communicate with the analysis and classification system 106 to request or transmit information, initiate a data gathering or analysis, and/or view analytics data about completed or in-progress software activities using the central user interface of the user computer system 104. As discussed previously, the user computer system 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user computer system 104 and/or processing device 114 to perform one or more steps described in this disclosure, or to cause other systems/devices to perform one or more steps described herein.

As further illustrated in FIG. 1, the analysis and classification system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, datastores 190, and/or the user computer system 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the analysis and classification system 106 comprises computer-readable instructions 142 or computer readable program code 142 stored in the memory device 140, which in one embodiment includes the computer-readable instructions 142 of a system application 144. In some embodiments, the system application 144 may include a baseline discovery tool, or application which facilitates in gathering information regarding applications or software running on one or more user computer systems 104. The baseline discovery tool may comprise the use of machine learning algorithm or neural network engine in order to intelligently query user computer systems 104 and users 102 for characteristic information of installed programs or software running on one or more devices connected to the network 101. Based on available response data and subsequent determinations made regarding the safety or utility or certain software or programs, the baseline discovery tool may be adapted (e.g., information gathering or querying approach may evolve over time, or the like), in order for the baseline discovery tool to more efficiently gather pertinent information.

The computer readable instructions 142, when executed by the processing device 138 are configured to cause the system 106/processing device 138 to perform one or more steps described in this disclosure to cause out systems/devices (such as the user computer system 104, the user application 122, and the like) to perform one or more steps described herein. In some embodiments, the memory device 140 includes a data storage for storing data related to software applications or programs installed on the user computer system 104, and may include data created and/or used by the system application 144. In other embodiments, the memory device 140 maintains only data related to immediate processing tasks or batch analysis, while the bulk of data analyzed by the system is stored in long term storage on datastores 190, which may be accessed, copied to, read by, or otherwise transmitted to the analysis and classification system 106 for further processing and classification at any time.

In the embodiment illustrated in FIG. 1, and described throughout much of this specification, a "system" configured for performing one or more steps described herein refers to the analysis and classification system 106, the access to which may be provided via user application 122. In some embodiments, the system application 144 or user application 133 may perform one or more activities either alone or in conjunction with the analysis and classification system 106. It is understood that entity system(s) 180 and third party system(s) 170 may contain the same or similar communication, processing, memory, and application components and described herein with respect to analysis and classification system 106. In some embodiments, the system application, a copy of the system application, or access to the system application may be stored on or otherwise provided as a service to entity system(s) 180 and third party system(s) 170 using said components. Additionally, it is understood that datastores 190 may represent data in some embodiments provided by or managed by each or all of the analysis and classification system 106, entity system 180, or third party system 170. In some embodiments access to retrieve or manipulate data from datastores 190 may be permissioned such that one or more entities may have differing levels of access and rights with respect to the data stored therein. For instance, analysis and classification system 106 may have read and write permissions, while one or more third party system 170 may only have read-access. In other embodiments, users 102 within the entity systems 180, third party systems 170, and analysis and classification system 106 may have tiered, permissioned access as well (e.g., only certain, authorized users may access and manipulate data on analysis and classification system 106 or datastore 190, or the like).

FIG. 2 depicts an operating environment 200 for a secure virtual environment system, in accordance with one embodiment of the present invention. In particular, FIG. 2 illustrates a secure virtual environment system 108 that is operatively coupled, via a network, to the user computer system 104 and analysis and classification system 106. In such a configuration, the secure virtual environment system 108 may, in some embodiments, transmit information to and/or receive information from the user computer system 104 and/or the analysis and classification system 106. It should be understood that FIG. 2 illustrates only an exemplary embodiment of the operating environment 200, and it will be appreciated that one or more functions of the systems, devices, or servers as depicted in FIG. 2 may be combined into a single system, device, or server or may be split between additional systems, devices, or servers (e.g., one or more of the foregoing).

For instance, the functions of the secure virtual environment system 108 and the analysis and classification system 106 may be performed by a single computing system. Furthermore, a single system, device, or server as depicted in FIG. 2 may represent multiple systems, devices, or servers. For instance, though the user computer system 104 is depicted as a single unit, the operating environment may comprise multiple computing systems. In addition, it is understood that the multiple systems, devices, or servers may be distributed among two or more parties or entities, as described in FIG. 1, which may be operatively connected to the analysis and classification system 106 via a network connection. For instance, the third party system 170 may be granted access to request relevant data from the analysis and classification system 106. In other instances, the third party system 170 may be granted access to use the secure virtual environment system 108 to analyze executable code. In further embodiments, the third party system 170 may submit relevant data about executable code in order to help build knowledge of potential use cases or vulnerabilities.

As illustrated in FIG. 1, the secure virtual environment system 108 may be a computing system that hosts the virtual environment provided to user computer system 104 or which may be used as a test environment for the analysis and classification system 106. Accordingly, the secure virtual environment system 108 may comprise a communication device 152, a processing device 154, and a memory device 156. The secure virtual environment system 108 may be a device such as a networked server, desktop computer, terminal, kiosk, or any other type of computing system as described herein. In other embodiments, the secure virtual environment system 108 may be a portable storage device such as a portable hard drive, flash memory drive, memory card, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 may be operatively coupled to the communication device 152 and the memory device 156 such that the processing device 154 uses the communication device 152 to communicate with the network and other devices on the network, such as, but not limited to the user computer system 104 and the analysis and classification system 106. In this regard, the communication device 152 generally comprises any wired or wireless device, such as a modem, antennae, WiFi or Ethernet adapter, radio transceiver, electrical connection, electrical circuit, or other device for communicating with other devices on the network. The one or more communication device 152 may further include an interface that accepts one or more network interface cards, ports for connection of network components, Universal Serial Bus (USB) connectors and the like.

The memory device 156 may have computer-readable instructions 160 stored thereon, which in one embodiment includes the computer-readable instructions 160 of an virtual environment application 162, such as dedicated applications (e.g., apps, applet, or the like), portions of dedicated applications, web browser or other apps that allow access to applications located on other systems, or the like. The computer-readable instructions 160 may comprise computer-executable program code which may instruct the processing device 154 to perform certain logic, data processing, and data storing functions of the application to accomplish the entity's objectives. For instance, the virtual environment application 162 may contain the instructions needed to generate instances of the virtual environment for validation testing. In some embodiments, the memory device 156 includes data storage 158 for storing data related to the system environment and installed software, applications, or programs.

As further illustrated in FIG. 2, the operating environment 200 may further comprise a user computer system 104 in operative communication with the secure virtual environment system 108. The user computer system 104 may be a computing system that is operated by a user 102, such as an administrator, agent, or employee of the entity. In other embodiments, the user 102 may be a user which is external to an organization, such as a customer or client of the organization. Accordingly, the user computer system 104 may be a device such as a desktop computer, IoT device, mobile device (e.g., phone, smartphone, laptop, tablet, single-board computer, or the like). The user computer system 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like). The operating environment 200 may further comprise an analysis and classification system 106. In some embodiments, the system may be able to efficiently control the execution of executable code within its network environment without expending computing resources unnecessarily by retesting the executable code.

In some embodiments, the computing systems may access one or more databases or datastores (such as datastore 190 as shown in FIG. 1) to search for and/or retrieve, or transmit information related to the installed programs or application. Any of the systems, such as the user computer system 104, secure virtual environment system 108, or the analysis and classification system 106, may also access a memory and/or datastore local to the various computing systems within the operating environment 200. The one or more memory devices may store any of a number of applications or programs which comprise computer-executable instructions/code executed by the processing device to implement the functions of the devices described herein.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, or other systems that perform various functions of the computing systems. These systems may comprise, for example, electrical circuits, motors, compressors, or any system that enables functioning of the computing systems.

FIG. 3 depicts an operating environment 300 for intelligent analysis of data via a baseline discovery solution, in accordance with one embodiment of the present invention. As discussed with regard to FIG. 1, in some embodiments, the system application 144 may include the baseline discovery solution tool, or an application which facilitates in gathering information regarding other applications or software running or installed on one or more user computer systems 104. The baseline discovery solution tool may comprise the use of machine learning algorithm or neural network engine in order to intelligently query user computer systems 104 and users 102 for characteristic information of installed programs or software running on one or more devices connected to the network 101. Based on available response data and subsequent determinations made regarding the safety or utility or certain software or programs, the baseline discovery solution tool may be adapted (e.g., information gathering or querying approach may evolve over time, or the like), in order for the baseline discovery solution tool to more efficiently gather pertinent information from devices connected to the network 101, or virtual machines running on the secure virtual environment system 108.

As shown in FIG. 3, information from the datastores 190 may be used to inform the process of analyzing and classifying software via the baseline discovery solution tool. Datastores 190 may further comprise software data 310, usage data 320, and user data 330. In some embodiments, software data 310 may include a database of information regarding what software programs are installed, what type of licensing the software requires, one or more coding languages utilized by the software, whether or not the source code or program code of the software is "open source," or the like. It is understood that this data may be retrieved by the baseline discovery solution tool for on one or more user computer systems 104 (or an "endpoint") connected to the network 101 or secure virtual environment system 108. In other embodiments, at least a portion of this information may be sourced from an entity system 180 or third party system 170, such as via a public database of information, a software licensor, or the like. In some embodiments, usage data 320 may include information on endpoint software usage, such as how often the software is run (e.g., such as frequency over a time period, the last known time the software was run, or the like), service calls generated by the software, software certificates, network connectivity generated by the software, resource computing requirements of the software, data formatting or file types that the software is compatible with, permissions granted to the software to make system changes, or the like. In some embodiments, user data 330 may comprise data regarding one or more users 102, such as their name, username, password, professional role, permissions level, authentication information, contacts, usage history, or the like.

As shown in block 340, the process may begin by the system retrieving software data 310, usage data 320, or user data 330 and identifying the presence of unknown software which installed on the user computing system 104. Based on historical data, the baseline discovery solution tool may select one or more programs or software that have been identified as unknown for further analysis and classification, as shown in block 342. For example, the baseline discovery solution tool may automatically call a database of previously analyzed and classified programs or software in order to conduct a cross referencing of software developer, version information, or the like as retrieved from the software data 310. In other embodiments, the baseline discovery solution tool may automatically conduct a comparison of usage data in order to generate a comparison of unknown software to the usage data of known programs in order to identify any potential similarities that may inform the analysis and classification of the unknown software or program. For instance, the service calls, generated network activity, resource requirements, or the like, may indicate that the unknown software is related to certain use case as compared to previously analyzed and classified software or programs (e.g., usage data for unknown software appears statistically similar to previously classified messaging service, therefore the unknown software may be provisionally classified as potentially being related to messaging services).

In some embodiments, the baseline discovery solution tool may be used for classification and analysis of software on endpoint devices, such as user computer systems 104, on a periodic basis. Furthermore, in some embodiments, a review of software or programs on endpoints devices, such as user computer systems 104, may have been conducted at a previous point in time, either by the baseline discovery solution tool or by manual review. In further embodiments, the entity controlling the system for analysis and classification 106 may have developed a pre-approved list of software or programs that are safe or authorized to install on user computer systems 104 connected to network 101, but may not have complete up-to-date information as to which software or programs are installed or running on one or more user computer systems 104. In still further embodiments, there may be one or more variants of the same type of software or program installed across multiple user computer systems 104, in which case there may be a lack of uniformity in regard to resource demand, security considerations, licensing, user license right, or the like (e.g., multiple teams of employees at the same company may use their own respective programs for capturing screenshots, whereas a single software or program solution may be satisfactory to meet all of the teams' needs). In any case, the baseline discovery solution tool may refer to such historical data as a first step in classifying the unknown software identified in block 340 and selected in block 342. If the baseline discovery solution tool identifies a match to pre-approved software or programs, based on any number of data points including data from the datastores 190, the system may generate a determination that the software or program is safe and authorized to be installed or running on the user computer device 104, as shown in block 348.

In embodiments where the pre-approval is not determined, the process may proceed to block 344, wherein the intelligent contextualization may be conducted via the baseline discovery solution tool. As previously noted, the baseline discovery solution tool may comprise a machine learning engine, and the intelligent contextualization via the baseline discovery solution tool may involve automated decisioning via the machine learning engine, but may also include manual adjustment and review, as noted in block 346. In any case, the machine learning engine of the baseline discovery tool may incorporate and conduct analysis of software data 310, usage data 320, and user data 330.

The machine learning engine may use this data to conduct an iterative analysis of received information in order to identify contextual significance based on historical information and classifications. The machine learning engine may conduct real-time, iterative, cognitive analysis of the data extracted from the datastore 190, or otherwise received by system from users, third parties, or the like, in order to further identify classification parameters for software and programs (e.g., a program's use or need within the entity, a program's potential security concerns, a program's benign nature, a programs open source or proprietary nature, or the like). It is understood that the machine learning engine utilizes an iterative process which is constantly improved in accuracy based on available data. It is also understood that the use of iterative machine learning create multiple models using extracted data periodically and select best accurate model for software classification and determination of potential security concerns.

For instance, the machine learning engine may adapt to patterns previously not identified by nature of emergent patterns in data received from users, third parties, software providers, or extracted from the datastores 190. In some embodiments, the machine learning engine utilizes a plurality of neural network models which are compared and selected, or combined to produce the most accurate pattern recognition or predictive capability based on available data. In this way, an ensemble of models may be used to achieve the most accurate predictive results, and the ensemble may be adapted over time as needed. The machine learning engine may comprise a supervised or unsupervised machine learning model, or ensemble of models, in order to classify unknown programs or software using a neural network architecture. The machine learning engine is configured to process a collection of data received by or stored on the system, which provides available training data allowing the system to develop a high level of adaptability to changing environments or an array of various system conditions, external application needs, user device statuses, user permissions, or the like, as may be reflected in changes in a received data stream in real time. In some embodiments, the machine learning engine may include an adversarial neural network. For example, transformer-based, attention-based, and bi-directional Long Short Term Memory (LSTM) Deep learning based network models may be used for encoding and decoding for pattern detection and classification of authorized or unauthorized software types.

This method incorporates the use of encoding and decoding in order to train one or more machine learning models and identify relevant patterns in received data from one or more channels of communication or extracted from the datastores 190. In some embodiments, different ensembles of similar machine learning models with different training characteristics may be combined to achieve a desired result or accuracy in data processing. Furthermore, the machine learning engine may be trained to generate questions in natural language which may be automatically forwarded to administrators or users 102 via the graphical user interface of a user computer device 104. Over time, due to the nature of the adversarial neural network architecture and iterative learning techniques described herein, the baseline discovery solution tool may be trained to ask increasingly relevant questions allowing for higher quality, useful feedback from users, or by which administrators can base their decisions. This process allows the security team of the entity or a third party utilizing the system to create an effective and accurate baseline of classification criteria which is used to control what software or programs can run within an organization, company, network, or the like.

In some embodiments, the baseline discovery tool may automate the gathering of information from users 102 via the user computer systems 104 via the user application 122, as noted by the generation of questions in natural language which may be forwarded to one or more users 102 via the user computer system 104. Once a potential need is identified for the unknown software or program, the process will determine if the need is satisfactory. In some embodiments, adequacy of gathered information may be determined by a human user reviewing the output or generated determination or recommendation from the baseline discovery solution tool, as shown by adjustment and review 346. In other embodiments, particularly in embodiments where the machine learning engine has been trained with a large enough amount of sample data in order to achieve a statistically acceptable degree of accuracy and precision in terms of classifying unknown software as determined by system administrators, the system may be configured to automatically rely on an adequacy determination of the baseline discovery solution tool itself. In embodiments where the process of determining adequacy of need is automated, one or more responsive actions may also be triggered if the need for the unknown software is deemed adequate, redundant, or potentially unauthorized or insecure. For instance, the system may generate a determination of inadequate or unjustifiable need, as shown in block 348, but may also trigger the blocking of access, blocking of execution, uninstallation, deletion, or some other responsive action regarding the software which would effectively disable its use by users 102 when using the connected user computer system on the network 101 or secure virtual environment system 108. In other embodiments, the system analysis and classification or human review of system results may result in a determination that there is an adequate need for the unknown program, in which case the system may also generate and store a determination of adequate need, as shown in block 348.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A system for automated software analysis and classification, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
      receive software data of a computer program, wherein the software data comprises user data, usage data, and classification data;
      select the software data of the computer program for further analysis and classification;
      access a historical database of pre-approved programs information containing one or more pre-approved program identifiers, wherein the historical database is categorized according to user data, usage data, and classification data;
      identify the computer program does not match one or more of the pre-approved program identifiers and label the computer program as an unknown program;
      in response to identifying the computer program does not match one or more of the pre-approved program identifiers, conduct an iterative machine learning analysis of the software data and identify relevant characteristics of the unknown program according to a data training set, wherein the iterative machine learning analysis further comprises use of a long short term memory deep learning network model to encode and decode for pattern detection and classification of authorized or unauthorized software types based on extrapolation of patterns from historical data; and
      based on the identified relevant characteristics of the unknown program, generate a classification for the unknown program, wherein the classification comprises a determination of whether the unknown program is redundant or unauthorized.

2. The system of claim 1, wherein the relevant characteristics comprise one or more factors related to a need for the computer program, wherein the need is based on redundancy of features of the unknown program as compared to one or more pre-approved programs.

3. The system of claim 1, further configured to generate a set of user questions based on the relevant characteristics of the unknown program.

4. The system of claim 3, wherein the set of user questions is automatically transmitted to one or more users via a user application on a user device.

5. The system of claim 1, wherein the relevant characteristics comprise one or more factors related to security vulnerability of the unknown program.

6. The system of claim 1, further configured to determine the unknown program as unauthorized, and automatically trigger a disabling of execution of the unknown program on a user device or virtual machine environment.

7. A computer program product for automated software analysis and classification, the computer program product comprising a non-transitory computer-readable storage medium having computer-executable instructions to:
   receive software data of a computer program, wherein the software data comprises user data, usage data, and classification data;
   select the software data of the computer program for further analysis and classification;
   access a historical database of pre-approved programs information containing one or more pre-approved program identifiers, wherein the historical database is categorized according to user data, usage data, and classification data;
   identify the computer program does not match one or more of the pre-approved program identifiers and label the computer program as an unknown program;
   in response to identifying the computer program does not match one or more of the pre-approved program identifiers, conduct an iterative machine learning analysis of the software data and identify relevant characteristics of the unknown program according to a data training set wherein the iterative machine learning analysis further comprises use of a long short term memory deep learning network model to encode and decode for pattern detection and classification of authorized or unauthorized software types based on extrapolation of patterns from historical data; and
   based on the identified relevant characteristics of the unknown program, generate a classification for the unknown program, wherein the classification comprises a determination of whether the unknown program is redundant or unauthorized.

8. The computer program product of claim 7, wherein the relevant characteristics comprise one or more factors related to a need for the computer program, wherein the need is based on redundancy of features of the unknown program as compared to one or more pre-approved programs.

9. The computer program product of claim 7, further configured to generate a set of user questions based on the relevant characteristics of the unknown program.

10. The computer program product of claim 9, wherein the set of user questions is automatically transmitted to one or more users via a user application on a user device.

11. The computer program product of claim 7, wherein the relevant characteristics comprise one or more factors related to security vulnerability of the unknown program.

12. The computer program product of claim 7, further configured to determine the unknown program as unauthorized, and automatically trigger a disabling of execution of the unknown program on a user device or virtual machine environment.

13. A computer implemented method for automated software analysis and classification, the computer implemented method comprising:
   providing a computing system comprising a computer processing device and a non-transitory computer readable medium, where the non-transitory computer readable medium comprises configured computer program instruction code, such that when said instruction code is operated by said computer processing device, said computer processing device performs the following operations:
     receiving software data of a computer program, wherein the software data comprises user data, usage data, and classification data;
     selecting the software data of the computer program for further analysis and classification;
     accessing a historical database of pre-approved programs information containing one or more pre-approved program identifiers, wherein the historical database is categorized according to user data, usage data, and classification data;
     identifying the computer program does not match one or more of the pre-approved program identifiers and label the computer program as an unknown program;
     in response to identifying the computer program does not match one or more of the pre-approved program identifiers, conducting an iterative machine learning analysis of the software data and identify relevant characteristics of the unknown program according to a data training set, wherein the iterative machine learning analysis further comprises use of a long short term memory deep learning network model to encode and decode for pattern detection and classification of authorized or unauthorized software types based on extrapolation of patterns from historical data; and
     generating a classification for the unknown program based on the identified relevant characteristics of the unknown program, wherein the classification comprises a determination of whether the unknown program is redundant or unauthorized.

14. The computer implemented method of claim 13, wherein the relevant characteristics comprise one or more factors related to a need for the computer program, wherein the need is based on redundancy of features of the unknown program as compared to one or more pre-approved programs.

15. The computer implemented method of claim 13, further configured to generate a set of user questions based on the relevant characteristics of the unknown program.

16. The computer implemented method of claim 13, wherein the relevant characteristics comprise one or more factors related to security vulnerability of the unknown program.

17. The computer implemented method of claim 13, further configured to determine the unknown program as unauthorized, and automatically trigger a disabling of execution of the unknown program on a user device or virtual machine environment.

* * * * *